United States Patent

Vig et al.

Patent Number: 5,869,763
Date of Patent: Feb. 9, 1999

[54] METHOD FOR MEASURING MASS CHANGE USING A QUARTZ CRYSTAL MICROBALANCE

[75] Inventors: John R. Vig, Colts Neck; Raymond L. Filler, Lebanon, both of N.J.

[73] Assignee: The United States of America as represented by the Secretary of the Army, Washington, D.C.

[21] Appl. No.: 545,162

[22] Filed: Oct. 19, 1995

[51] Int. Cl.$^6$ ....................................................... G01L 1/00
[52] U.S. Cl. .......................... 73/580; 73/433; 73/862.59; 73/DIG. 1; 73/DIG. 4; 374/117; 177/210 FP; 177/DIG. 11; 310/312; 310/338; 364/508; 364/557; 364/567
[58] Field of Search .......................... 73/580, 433, 54.41, 73/54.42, 579, 32 A, DIG. 1, DIG. 4, 862.59; 374/117, 118, 163, 172, 185; 177/210 FP, DIG. 11, 210 R; 310/312, 313 A, 338; 340/666, 634, 658; 324/71.4, 71.5; 331/158, 176; 364/508, 557, 567

[56] References Cited

U.S. PATENT DOCUMENTS

| 3,492,858 | 2/1970 | Heflinger et al. ........................... 73/580 |
| 3,715,911 | 2/1973 | Chuan .......................................... 73/28 |
| 3,879,992 | 4/1975 | Bartera ..................................... 73/24.05 |
| 3,926,271 | 12/1975 | Patashnick ............................... 177/210 |
| 4,050,530 | 9/1977 | Storace ......................................... 177/1 |
| 4,079,280 | 3/1978 | Kusters et al. ........................... 310/318 |
| 4,239,088 | 12/1980 | Check et al. ....................... 177/210 FP |
| 4,294,105 | 10/1981 | Kelly ........................................... 73/28 |
| 4,472,656 | 9/1984 | Franx ....................................... 310/361 |
| 4,535,638 | 8/1985 | Eernise et al. ....................... 73/DIG. 4 |
| 4,701,661 | 10/1987 | Warner et al. .......................... 310/360 |
| 4,870,313 | 9/1989 | Hirama et al. .......................... 310/320 |
| 4,872,765 | 10/1989 | Schodowski ............................ 374/117 |
| 5,179,028 | 1/1993 | Vali et al. ............................. 73/DIG. 4 |
| 5,201,215 | 4/1993 | Granstaff et al. ...................... 73/54.41 |
| 5,422,664 | 6/1995 | Stephany ................................... 347/14 |

OTHER PUBLICATIONS

C. Lu and A.W. Czanderna, "Applications of Piezoelectric Quartz Microbalances", Elsevier, (1984). (pp. 1–9, 147–153 191–192) Apr., 1984.

*Primary Examiner*—Hezron Williams
*Assistant Examiner*—Richard A. Moller
*Attorney, Agent, or Firm*—Michael Zelenka

[57] ABSTRACT

A quartz crystal resonator is excited in two different modes at the same time such that the mass change and the temperature change can be measured independently. In using such a quartz crystal the change in mass can be calculated accurately and in real time, independent of temperature effects.

9 Claims, 1 Drawing Sheet

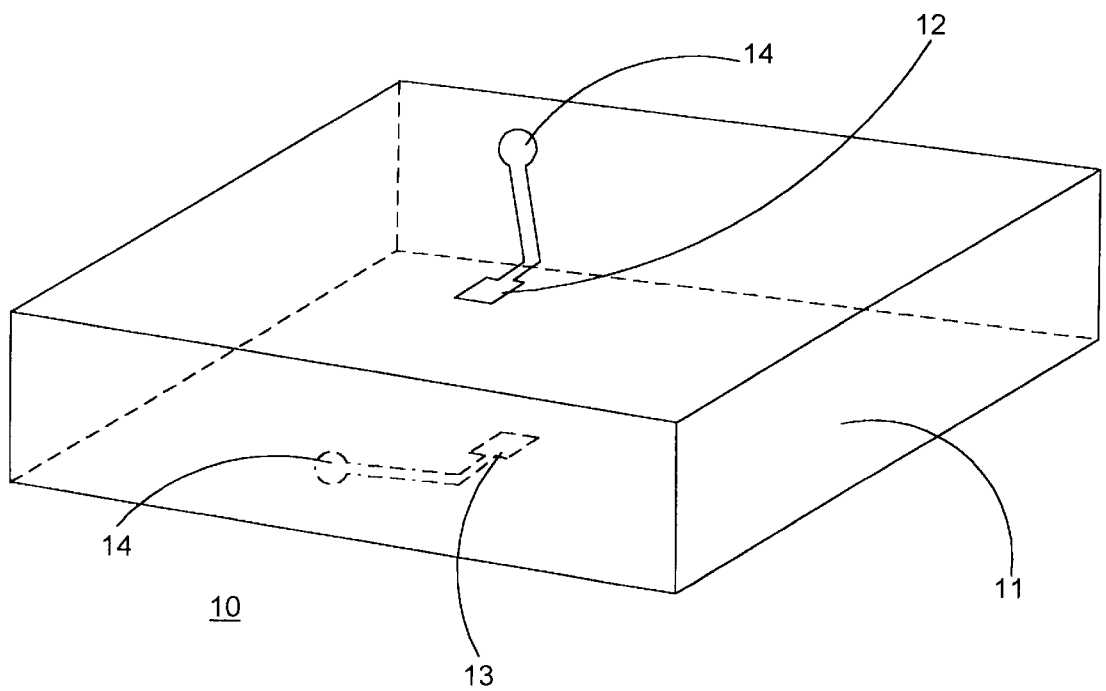
FIGURE

METHOD FOR MEASURING MASS CHANGE USING A QUARTZ CRYSTAL MICROBALANCE

GOVERNMENT INTEREST

The invention described herein may be manufactured, used, sold, imported, and licensed by or for the Government of the United States of America without the payment to us of any royalty thereon.

FIELD OF THE INVENTION

This invention relates generally to a method of measuring small changes in mass using quartz crystal microbalances and more particularly to a method which calculates a change in mass from a combination of the changes in a mass sensing frequency and a temperature sensing frequency.

BACKGROUND OF THE INVENTION

Quartz crystal microbalances used to sense small mass changes are well known in the prior art. Typical microbalances based on quartz technology are described in a treatise by C. Lu and A. W. Czanderna, *Applications of Piezoelectric Quartz Microbalances*, Elsevier, (1984). Microbalances are usually used to sense changes in mass during thin film and vapor deposition fabrication of solid-state electronic devices to ensure that such devices are fabricated according to specified tolerances. Microbalances are also used to sense absorbates and warn of chemical contamination.

A microbalance typically consists of an AT-cut or BT-cut crystal resonator. Mass added to or removed from the resonator results in a frequency change. The change in mass can be calculated from this frequency change. For small changes in mass, the frequency change is linearly proportional to the change in mass, provided that the temperature remains constant during deposition.

Although the frequency of a quartz crystal resonator is highly sensitive to changes in mass, it is also sensitive to changes in temperature. Thus, the frequency change measured by a microbalance is effected by both changes in mass and temperature. Resonators used in conventional microbalances, such as those employing an AT-cut, have a zero temperature coefficient at only two temperatures called the "turnover temperatures." Consequently, the further away the operating temperature of a microbalance is from the nearest turnover temperature, the more sensitive is the microbalance to temperature changes, i.e., the larger is the uncertainty in the mass change indicated by the microbalance.

Conventional methods used to control the effects of temperature on a microbalance include: 1) controlling the temperature of the crystal by cooling it; 2) attaching a thermocouple to the crystal to measure the frequency vs. temperature characteristics and then compensating for the temperature effects; 3) using two identical crystals, one of which is exposed to mass changes, the other of which is not; 4) forming two resonators on one crystal plate and exposing only one of them to the mass change; 5) using multiple resonators to allow compensation for different quantities, such as mass, temperature, stress, etc.; and 6) using an "electrode-tab" resonator, on which at least one additional single electrode, the "tab", is deposited with the additional mass only being deposited on the tab. All of these methods suffer from the drawbacks of being cumbersome and inaccurate. For example, the sixth method listed has the disadvantage of a mass range limitation. Moreover, the electrode-tab microbalance is not easily reproduced because the slight differences in the electrode-gap-tab geometries may particularly effect the mass dependence of the resonant frequencies. Therefore, the mass coefficients obtained from earlier calibrations may differ from later ones. Further, with all these methods it is very difficult to determine the temperature of the crystal itself because all these methods require a separate determination of the temperature of the crystal which requires measuring the temperature where the temperature sensor is mounted at some distance from the crystal. Since it is nearly impossible to avoid spatial temperature variations, especially at higher temperatures, the observed temperature generally differs from the temperature of the crystal. Chapter 5 of the treatise by C. Lu and A. W. Czanderna, *Applications of Piezoelectric Quartz Microbalances*, Elsevier, (1984), cited above, discusses various ways prior art devices have attempted to solve the temperature dependency of microbalances based on quartz crystal technology.

Accordingly, in the microbalance art, there exists a need to eliminate this temperature dependency problem. This invention addresses such a need.

SUMMARY OF THE INVENTION

Accordingly, an object of this invention is to provide an improved method for sensing mass changes using a quartz crystal microbalance which can automatically compensate for variations in ambient temperature without effecting the accuracy of the microbalance.

Specifically, an object of the invention is to provide a mass sensor that is insensitive to temperature changes and that is easily manufactured with methods known in the art.

This is accomplished by forming a quartz crystal resonator which can be excited in two different modes at the same time such that the mass change and the temperature change can be measured independently. This can be done, for example, by selecting a doubly rotated quartz crystal cut such as an SC-cut. The SC-cut crystal may be excited simultaneously on a b-mode and a c-mode, the b-mode being highly sensitive to temperature and the c-mode being temperature compensated. Alternatively, the SC-cut crystal may be excited on the fundamental mode and third overtone, and a temperature sensitive beat frequency can be derived from these two modes by subtracting three times the fundamental mode frequency from the third overtone frequency, or by subtracting one third of the third overtone frequency from the fundamental mode frequency. The frequencies of both the b-mode and the beat frequency derived from the two c-modes are monotonic and nearly linear functions of temperature. Therefore, these can be used to sense changes in temperature of the microbalance. In using such a method, the change in frequency due to mass loading and temperature changes can be easily calculated from the changes in mass sensing frequency and a temperature sensing frequency in real time. Thus the microbalance can accurately sense mass changes, without the interfering effects of the temperature induced frequency changes which occur in conventional microbalances.

BRIEF DESCRIPTION OF THE DRAWINGS

These and other features of the invention will be better understood in view of the following Detailed Description of the Invention and the attached figure wherein:

FIG. 1 shows an exemplary embodiment of a quartz crystal microbalance used according to the method of this invention.

DETAILED DESCRIPTION OF THE INVENTION

Referring to FIG. 1 there is shown an exemplary embodiment of microbalance 10 used according to the method of this invention. Microbalance 10 is preferably an SC-cut quartz crystal 11 having a front electrode 12, a back electrode 13, and an electrical connection 14. Although an SC-cut quartz crystal is the preferred material and cut, other materials and cuts may be used according to the present invention, the only requirements being that the crystal can be excited in two modes simultaneously and that the temperature and mass change sensitivities be known. Those skilled in the art will be able to design any such crystal microbalance given the following description.

Two methods of simultaneously exciting a resonator on two modes in a dual mode oscillator are described in U.S. Pat. No. 4,872,765 issued to Schodowski on Oct. 10, 1989 and U.S. Pat. No. 4,079,280 issued to Kusters et al in March 1978, both of which are incorporated herein by reference. These methods provide a temperature sensing device which is useful in stabilizing the output frequency of the oscillator.

The benefits of using an SC-cut quartz crystal are described below. An SC-cut quartz crystal 11 has mechanical resonances of the thickness-shear vibrational modes near those frequencies that satisfy:

$$f_N = Nv/(2t) \tag{1}$$

where N=1,3,5, ..., v is the velocity of sound in the thickness direction, and t is the thickness of crystal 11. These resonance frequencies can be measured through appropriate passive or active RF excitation provided via electrical connection 14. Since both v and t are sensitive to temperature and mass change, it follows that the resonant frequencies are sensitive to these parameters. In addition, v is also a function of the acoustic mode polarization, i.e., the direction of particle motion.

Employing the method of the present invention, microbalance 10 utilizes two different frequencies to measure changes in mass. The mass sensing frequency is represented by $f_m$, the temperature sensing frequency is represented by $f_t$, a, b, c and d are appropriate coefficients, $\Delta f_m$ and $\Delta f_t$ are the changes in $f_m$ and $f_t$ respectively, and $\Delta m$ and $\Delta T$ are small changes in the microbalance's mass and temperature, respectively. Then, for small changes in mass and temperature:

$$\Delta f_m = a\Delta m + b\Delta T \tag{2}$$

and $$\Delta f_t = c\Delta m + d\Delta T \tag{3}$$

It therefore follows that:

$$d\Delta f_m - b\Delta f_t = (ad - bc)\Delta m \tag{4}$$

and $$c\Delta f_m - a\Delta f_t = (bc - ad)\Delta T \tag{5}$$

Thus:

$$\Delta m = \frac{d\Delta f_m - b\Delta f_t}{ad - bc} \tag{6}$$

and $$\Delta T = \frac{c\Delta f_m - a\Delta f_t}{bc - ad} \tag{7}$$

For larger changes in mass and temperature, higher order approximations must be used to relate said changes to frequency changes. Equations (6) and (7) become nonlinear for large changes in temperature and mass. However, since microbalance 10 can include a microprocessor, even large changes in temperature and mass, and thus nonlinear equations can be solved accurately.

The mass change coefficients a and c are well known and remain constant for a given resonator design. The temperature coefficients b and d must be obtained for each resonator during a frequency vs. temperature calibration measurement, although the d coefficient remains fairly constant for a given design. Calibrating $f_m$ in terms of $f_t$ instead of T also allows more accurate measurements as $f_t$ can be measured much more accurately than can T. As mass accumulates on the resonator, this increase in mass can affect the calibration of the resonator thereby requiring compensation or periodic recalibration in order to ensure the most accurate measurements possible.

The values of $f_m$ and $f_t$ should be recorded immediately before and after a mass deposition. Recording the two frequencies during deposition is also desirable as it allows more accurate curve fitting.

To obtain the best results, the method which is the subject of this invention is preferably performed using a stress compensation cut (SC-cut) resonator excited on the fundamental and third overtone c-mode frequencies. The $f_m$ can be either of the c-mode frequencies, and the $f_t$, can be the beat frequency obtained from the third overtone frequency minus three times the fundamental mode frequency. This beat frequency is a monotonic and nearly linear function of temperature, the frequency vs. temperature slope of which is typically about 80 parts per million per °C. A suitable SC-cut crystal to use is a 10 MHz third overtone, with a crystal plate diameter of 14 millimeters and a contour of 2.5 to 3.0 diopters. The SC-cut resonator is more resistant to thermal shock, and to the stress effects from electrodes, mounting and acceleration than are the more common AT and BT-cut resonators. The SC-cut is a doubly-rotated cut whereas both the AT-cut and the BT-cut are singly-rotated cuts. The use of the second rotation of the quartz resonator provides an additional degree of freedom so that stress effects can be minimized along with the temperature effects. There are temperature effects at the resonant frequency of the SC-cut which are similar to the behavior found in resonators having an AT-cut or BT-cut. However, the second rotation of the resonator has been chosen to also minimize frequency shifts caused by some important types of stresses. The absence of frequency shifts induced by thermal shock offers an important advantage of the SC-cut over the AT-cut or BT-cut and permits certain microbalance experiments to be performed that can not be performed using the AT-cut or BT-cut without unacceptable interpretive ambiguity due to transient frequency shifts.

It will be understood that the method as described herein is merely exemplary and that a person skilled in the art may make many variations and modifications to the described embodiment utilizing functionally equivalent elements to those described. Any variations or modifications to the invention just described are intended to be included within the scope of said invention as defined by the appended claims.

What is claimed is:

1. A crystal microbalance comprising:
   a crystal having a cut and rotation such that the crystal can be excited in two different modes simultaneously;
   means to apply a first and second frequencies to the crystal wherein the first frequency is temperature sensitive and the second other frequency is mass sensitive; and
   means to calculate a mass applied to the crystal from a combination of the first and second frequencies.

2. The microbalance according to claim 1, wherein the crystal is an SC-cut quartz resonator.

3. The microbalance according to claim 1, wherein the second frequency is linearly proportional to the change in the mass of the resonator.

4. The microbalance according to claim 1, wherein the crystal has a cut and rotation such that the change in the mass of said crystal is derived from a combination of said changes in said first and second frequencies.

5. The microbalance according to claim 1, wherein the means to calculate the mass deposited includes deriving the change in the temperature of the resonator from the change in the first frequency and using the change in the temperature to compensate for the change in the second frequency due to the combination of the changes in the temperature of the microbalance and the mass placed on the microbalance.

6. The microbalance according to claim 5, wherein the microbalance includes a microprocessor for calculating the change in the temperature.

7. The microbalance according to claim 2, wherein the resonator is excited on a fundamental frequency and on a third overtone frequency.

8. The microbalance according to claim 2, wherein the resonator is excited along two c-modes of the resonator and the temperature of the resonator is derived from the change in frequencies of b-mode frequency and a beat frequency of the resonator.

9. The microbalance according to claim 4, wherein a mass sensing frequency is calibrated in terms of a temperature sensing frequency.

* * * * *